United States Patent
Hiratsuka

(10) Patent No.: US 10,109,854 B2
(45) Date of Patent: Oct. 23, 2018

(54) POSITIVE ELECTRODE ACTIVE MATERIAL FOR NONAQUEOUS ELECTROLYTE SECONDARY BATTERIES AND NONAQUEOUS ELECTROLYTE SECONDARY BATTERY

(71) Applicant: Panasonic Corporation, Osaka (JP)

(72) Inventor: Hidekazu Hiratsuka, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 15/211,690

(22) Filed: Jul. 15, 2016

(65) Prior Publication Data

US 2017/0092945 A1    Mar. 30, 2017

(30) Foreign Application Priority Data

Sep. 30, 2015  (JP) ................................ 2015-194199

(51) Int. Cl.
| | |
|---|---|
| *H01M 4/525* | (2010.01) |
| *H01M 4/38* | (2006.01) |
| *H01M 2/16* | (2006.01) |
| *H01M 4/134* | (2010.01) |
| *H01M 4/62* | (2006.01) |

(Continued)

(52) U.S. Cl.
CPC ........... *H01M 4/38* (2013.01); *H01M 2/1673* (2013.01); *H01M 4/131* (2013.01); *H01M 4/134* (2013.01); *H01M 4/505* (2013.01); *H01M 4/525* (2013.01); *H01M 4/624* (2013.01);

(Continued)

(58) Field of Classification Search
CPC .. H01M 4/525; H01M 4/505; H01M 10/0587; H01M 4/661; H01M 10/0431; H01M 10/0525; H01M 4/131; H01M 4/64; H01M 2004/021; H01M 10/052; H01M 2004/028
See application file for complete search history.

(56) References Cited

U.S. PATENT DOCUMENTS

2001/0036578 A1*  11/2001  Nishida ............... H01M 4/131
                                                                  429/231.3
2002/0142222 A1   10/2002  Nishida et al.
(Continued)

FOREIGN PATENT DOCUMENTS

| JP | 10-308218 | 11/1998 |
|---|---|---|
| JP | 2004-220897 A | 8/2004 |

(Continued)

OTHER PUBLICATIONS

Non-Final Office Action issued in U.S. Appl. No. 14/601,457, dated Mar. 3, 2016.

(Continued)

*Primary Examiner* — Wojciech Haske
(74) *Attorney, Agent, or Firm* — McDermott Will & Emery LLP

(57) ABSTRACT

A positive electrode active material for use in nonaqueous electrolyte secondary batteries. The active material is composed of particles each formed by the gathering of grains that comprises at least one metal element selected from the group consisting of Ta and Nb. One of the particles has a compression fracture strength of 500 MPa or more. The grain diameter in the (110) vector direction of the particles is 100 nm to 300 nm.

8 Claims, 7 Drawing Sheets

(51) Int. Cl.
  *H01M 10/0525* (2010.01)
  *H01M 4/131* (2010.01)
  *H01M 4/505* (2010.01)
  *H01M 4/02* (2006.01)

(52) U.S. Cl.
  CPC .. *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2003/0129495 | A1 | 7/2003 | Yamato et al. |
| 2005/0220700 | A1 | 10/2005 | Suhara et al. |
| 2005/0271944 | A1 | 12/2005 | Suhara et al. |
| 2009/0035659 | A1 | 2/2009 | Takeuchi et al. |
| 2009/0057137 | A1 | 3/2009 | Pitts et al. |
| 2009/0104530 | A1 | 4/2009 | Shizuka et al. |
| 2010/0173202 | A1 | 7/2010 | Saito et al. |
| 2010/0219370 | A1* | 9/2010 | Nakamura ............ B82Y 30/00 252/182.1 |
| 2010/0248040 | A1 | 9/2010 | Saito et al. |
| 2010/0276217 | A1 | 11/2010 | Sugaya et al. |
| 2011/0171529 | A1 | 7/2011 | Kono et al. |
| 2011/0240913 | A1* | 10/2011 | Kim ................ C01G 45/1228 252/182.1 |
| 2012/0135319 | A1 | 5/2012 | Saito et al. |
| 2012/0276446 | A1 | 11/2012 | Kawai |
| 2013/0078520 | A1 | 3/2013 | Toya et al. |
| 2013/0108920 | A1 | 5/2013 | Oladeji |
| 2013/0146808 | A1 | 6/2013 | Endo et al. |
| 2013/0164605 | A1* | 6/2013 | Shimura ............... H01M 4/133 429/163 |
| 2013/0330609 | A1 | 12/2013 | Sawa et al. |
| 2014/0079990 | A1 | 3/2014 | Yanagida et al. |
| 2015/0221934 | A1 | 8/2015 | Hiratsuka et al. |
| 2015/0243982 | A1 | 8/2015 | Hiratsuka et al. |
| 2016/0248090 | A1 | 8/2016 | Maeda et al. |

FOREIGN PATENT DOCUMENTS

| | | |
|---|---|---|
| JP | 2006-310181 A | 11/2006 |
| JP | 2007-220650 A | 8/2007 |
| JP | 2007-257885 A | 10/2007 |
| JP | 2008-152923 A | 7/2008 |
| JP | 2009-032681 A | 2/2009 |
| JP | 2010-129509 A | 6/2010 |
| JP | 2012-238581 A | 12/2012 |
| WO | 2004/082046 A1 | 9/2004 |
| WO | 2009/139157 A1 | 11/2009 |
| WO | 2012/039413 A1 | 3/2012 |
| WO | 2012/165207 A1 | 12/2012 |
| WO | 2012/169083 A1 | 12/2012 |
| WO | 2014/103166 | 7/2014 |
| WO | 2014/103166 A1 | 7/2014 |

OTHER PUBLICATIONS

Final Office Action issued in U.S. Appl. No. 14/601,457, dated Aug. 26, 2016.
Non-Final Office Action issued in U.S. Appl. No. 14/962,986, dated Jan. 5, 2017.
Specification and prosecution history of U.S. Appl. No. 15/367,134, filed Dec. 1, 2016.
Specification and prosecution history of U.S. Appl. No. 14/424,326, filed Feb. 26, 2015.
Office Action dated Nov. 8, 2016, issued in counterpart Japanese Application No. 2014-554091. 3 pages.
Notification of Transmittal of Translation of the International Preliminary Report on Patentabililty (Form PCT/IB/338) issued in counterpart International Application No. PCT/JP2013/006977 dated Jul. 9, 2015 with Forms PCT/IB/326, PCT/IB/373 and PCT/ISA/237, with English translation. (10 pages).
International Search Report dated Jan. 21, 2014, issued in corresponding Application No. PCT/JP2013/006977; with English translation.
Final Office Action issued in U.S. Appl. No. 14/962,986, dated Jun. 30, 2017.
Non-Final Office Action issued in U.S. Appl. No. 15/600,188, dated Jun. 16, 2017.

* cited by examiner

POSITIVE ELECTRODE ACTIVE MATERIAL FOR NONAQUEOUS ELECTROLYTE SECONDARY BATTERIES AND NONAQUEOUS ELECTROLYTE SECONDARY BATTERY

BACKGROUND

1. Technical Field

The present disclosure relates to a positive electrode active material for nonaqueous electrolyte secondary batteries and a nonaqueous electrolyte secondary battery.

2. Description of the Related Art

Nonaqueous electrolyte secondary batteries need to have both high capacity and enhanced cycle characteristics. Therefore, a positive electrode, including a positive electrode core and a positive electrode active material layer placed thereon, for nonaqueous electrolyte secondary batteries needs to have high filling properties for high capacity and high durability for enhanced cycle characteristics.

WO 2014/103166 discloses that capacity density and cycle characteristics are improved in such a manner that the powder fracture strength of a positive electrode active material is adjusted to 300 MPa to 500 MPa and the grain size of the positive electrode active material is controlled to 100 nm to 300 nm.

However, in the case where a pressure of 500 MPa or more is applied to particles making up a positive electrode active material for the purpose of increasing the density of a positive electrode, the particles are cracked. A positive electrode active material with excellent cycle characteristics cannot be obtained.

SUMMARY

In one general aspect, the techniques disclosed here feature a positive electrode active material for use in nonaqueous electrolyte secondary batteries. A positive electrode active material for use in nonaqueous electrolyte secondary batteries. The active material is composed of particles each formed by the gathering of grains that comprises at least one metal element selected from the group consisting of Ta and Nb. One of the particles has a compression fracture strength of 500 MPa or more. The grain diameter in the (110) vector direction of the particles is 100 nm to 300 nm.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
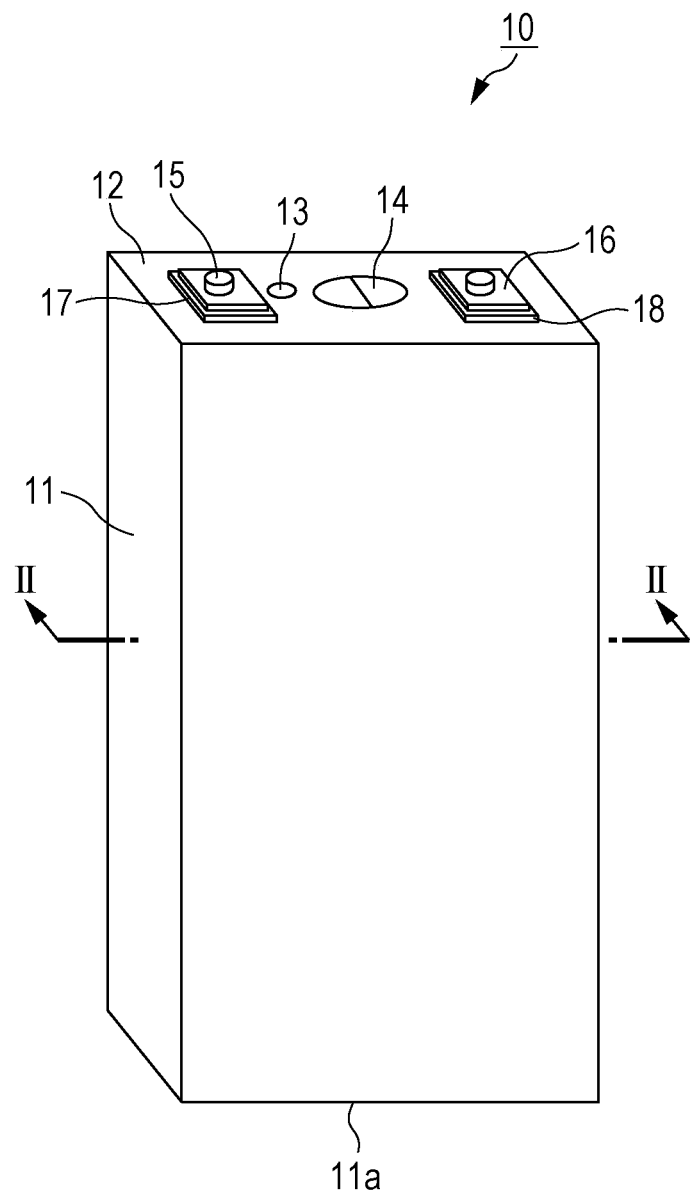
FIG. 1 is a perspective view of an example of a nonaqueous electrolyte secondary battery according to an embodiment of the present disclosure.

A positive electrode for nonaqueous electrolyte secondary batteries has a configuration in which a positive electrode active material layer is placed on a positive electrode core. The positive electrode active material layer desirably has higher filling properties for the purpose of increasing the capacity of a battery. The positive electrode active material layer needs to be compressed with a pressure of 500 MPa or more for the purpose of increasing filling properties. However, in the case where a pressure of 500 MPa or more is applied to the positive electrode active material layer, particles making up the positive electrode active material layer are cracked in some cases. The cracking of the particles may possibly cause the deterioration of cycle characteristics and therefore is not desirable. Hence, the increase in hardness of particles is needed.

The inventor has conceived that the hardness of particles is increased by adding Ta and Nb, which have hard characteristics, to a source of a positive electrode active material when the positive electrode active material is produced. However, the use of Ta and Nb to produce the positive electrode active material reduces the grain size of the positive electrode active material. When the grain size is small, the ionic conductivity is low and a high-capacity battery is not obtained.

The inventor has conducted intensive investigations to solve the above problem. As a result, the inventor has devised that Ta and Nb, which have hard characteristics, are added to a source of a positive electrode active material and a calcination step is divided into two stages when the positive electrode active material is produced for a positive electrode for nonaqueous electrolyte secondary batteries. In particular, in the first stage of calcination, at least one of Ta and Nb is added and calcination is performed at high temperature, whereby the hardness of particles is adjusted to 500 MPa or more and the particles are grown to be spherical. In this stage, the size of grains is small. In the second stage of calcination, calcination is performed at low temperature, whereby the hardness of particles is adjusted to 500 MPa or more and the grain size is appropriately controlled.

The inventor has found that a positive electrode active material capable of withstanding high compression can be produced using such a calcination step without varying the grain size even though Ta and Nb are added, thereby devising the present disclosure. According to the present disclosure, the hardness of the positive electrode active material can be increased and an appropriate grain size can be achieved. Therefore, in a positive electrode for nonaqueous electrolyte secondary batteries, particles making up the positive electrode active material can be highly compressed without being cracked. The positive electrode can be used to manufacture a battery with high capacity and excellent cycle characteristics.

Embodiments of the present disclosure are described below in detail with reference to the attached drawings. The drawings, which are referenced in the embodiments, are schematic and therefore the dimensional ratio and the like of components depicted in the drawings are different from those of actual components in some cases. The specific dimensional ratio and the like of components should be determined by taking descriptions below into consideration.

Figure 2:
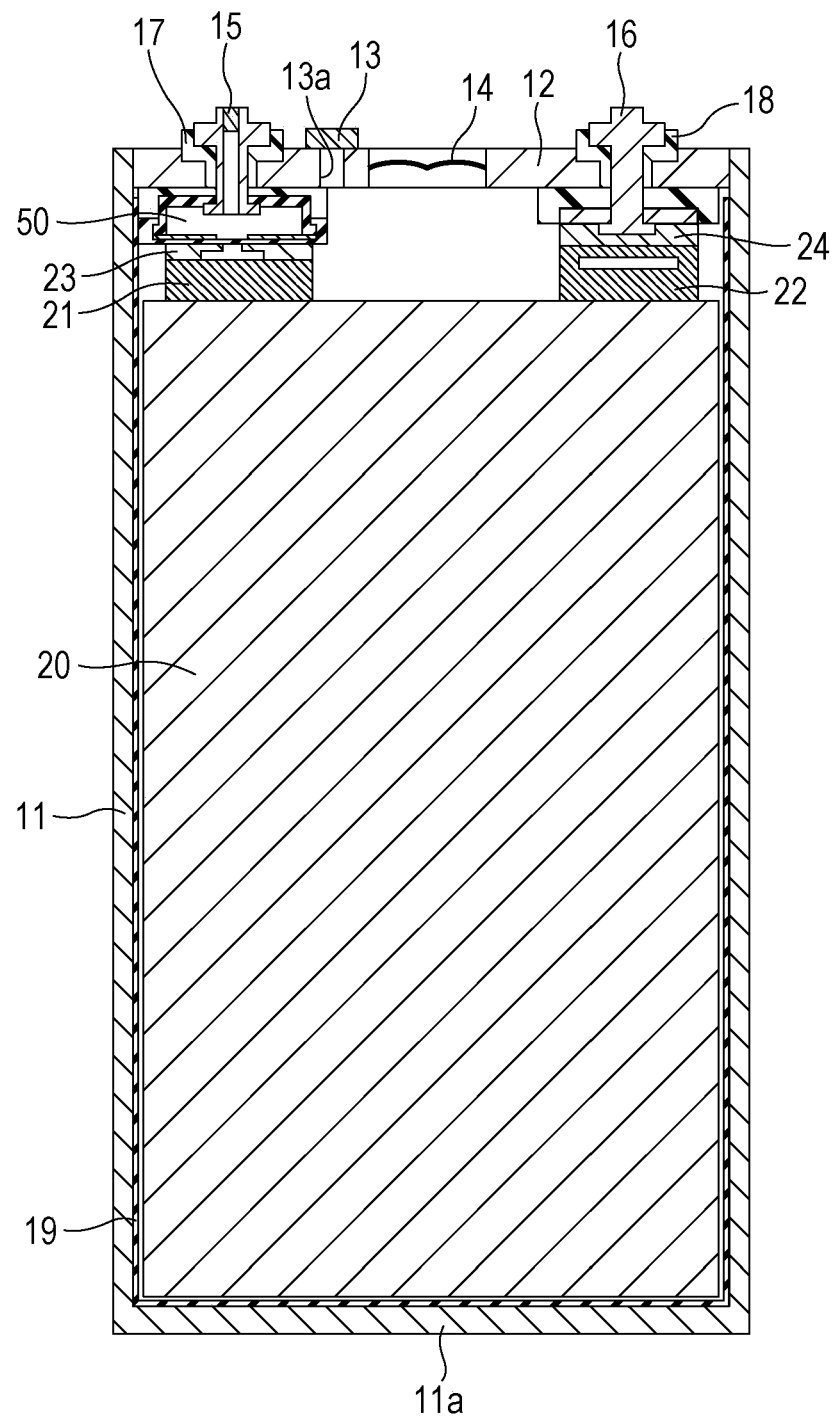
FIG. 2 is a sectional view taken along the line II-II of FIG. 1.

FIG. 1 is a perspective view of an example of a nonaqueous electrolyte secondary battery 10 according to an embodiment of the present disclosure. FIG. 2 is a sectional view taken along the line II-II of FIG. 1. The nonaqueous electrolyte secondary battery 10 includes an enclosure can 11 which is bottomed and which has an opening and also includes a sealing plate 12 hermetically sealing the opening. The enclosure can 11 houses an electrode assembly 20 and a nonaqueous electrolyte and is a rectangular container which has a bottomed tubular shape. The enclosure can 11 includes a bottom section 11a. The opening is located in a position facing the bottom section 11a. The sealing plate 12 is a lid hermetically sealing the enclosure can 11 and is provided with a sealing plug 13 sealing a liquid inlet 13a for introducing the nonaqueous electrolyte, a gas discharge valve 14, a positive electrode external terminal 15, and a negative electrode external terminal 16. The gas discharge valve 14 is one for discharging gas in the nonaqueous electrolyte secondary battery 10 out of the nonaqueous electrolyte secondary battery 10.

The positive electrode external terminal 15 has the function of electrically connecting the positive electrode to an external power supply. The negative electrode external terminal 16 has the function of electrically connecting the negative electrode to the external power supply. The positive electrode external terminal 15 is attached to the sealing plate 12 in such a state that the positive electrode external terminal 15 is electrically insulated from the sealing plate 12 with an insulating gasket 17. The negative electrode external terminal 16 is attached to the sealing plate 12 in such a state that the negative electrode external terminal 16 is electrically insulated from the sealing plate 12 with an insulating gasket 18. The gaskets 17 and 18 are desirably made of resin.

As shown in FIG. 2, the electrode assembly 20 is housed in the enclosure can 11. Side surfaces and a bottom surface of the electrode assembly 20 are covered by an insulating sheet 19. The insulating sheet 19 is desirably folded in a box shape so as to follow inner walls of the enclosure can 11 or is desirably bag-shaped so as to cover the electrode assembly 20.

A positive electrode tab section 21 is placed on a sealing plate 12-side end portion of the electrode assembly 20. A negative electrode tab section 22 is placed on another sealing plate 12-side end portion of the electrode assembly 20. The positive electrode tab section 21 is connected to a positive electrode current-collecting lead 23. The negative electrode tab section 22 is connected to a negative electrode current-collecting lead 24. The positive electrode current-collecting lead 23 is electrically connected to the positive electrode external terminal 15 through a current-blocking mechanism 25. The negative electrode current-collecting lead 24 is electrically connected to the negative electrode external terminal 16.

Figure 3:
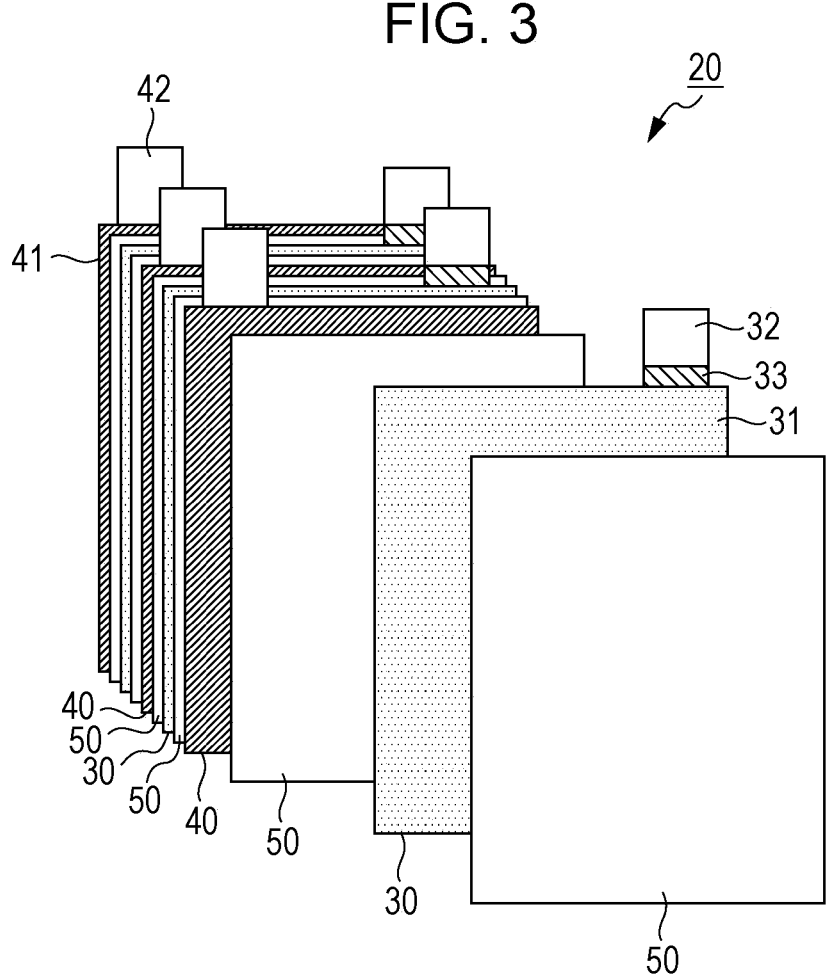
FIG. 3 is a schematic view of an example of an electrode assembly used in the nonaqueous electrolyte secondary battery shown in FIG. 1.

FIG. 3 is a schematic view of an example of the electrode assembly 20. The electrode assembly 20 includes positive electrodes 30 containing a positive electrode active material, negative electrodes 40, and separators 50 placed between the positive electrodes 30 and the negative electrodes 40. The positive electrodes 30 and the negative electrodes 40 are plate-shaped and are stacked with the separators 50 therebetween to form the electrode assembly 20, which is a stack type. If the positive electrodes 30 and the negative electrodes 40 are roll-shaped, the positive electrodes 30 may possibly be bent when the active material density of the positive electrodes 30 is high. However, in this embodiment, the positive electrodes 30 are plate-shaped and therefore a high active material density of 3.6 g/cc or more can be achieved.

As shown in FIG. 3, each positive electrode 30 includes a rectangular region including a positive electrode core and positive electrode active material layers 31 placed on both surfaces of the positive electrode core and a positive electrode core-exposed section 32 is placed on an end of a short side of the rectangular region. The positive electrode core-exposed sections 32 are stacked to form the positive electrode tab section 21. A protective layer higher in electrical resistance than the positive electrode core or an insulating layer is placed on a base portion 33 of each positive electrode core-exposed section 32.

Each negative electrode 40 includes a rectangular region including a negative electrode core and negative electrode active material layers 41 placed on both surfaces of the negative electrode core and a negative electrode core-exposed section 42 is placed on an end of a short side of the rectangular region. The negative electrode core-exposed sections 42 are stacked to form the negative electrode tab section 22. The size of the negative electrodes 40 is desirably slightly larger than the size of the positive electrodes 30 from the viewpoint of capacity to accept lithium ions during charge.

The case where the positive electrodes 30 is located in the outermost position of the electrode assembly 20 is obtained in such a manner that, for example, 101 of the positive electrodes 30 and 100 of the negative electrodes 40 are stacked with the separators 50 therebetween. The separators 50 are made of a polyolefin. As shown in FIG. 3, the electrode assembly 20 is rectangular and the positive electrode tab section 21 is placed on one end of a short side of the electrode assembly 20, the positive electrode tab section 21 being composed of 101 of the stacked positive electrode core-exposed sections 32. The negative electrode tab section 22 is placed on the other end of the short side thereof, the negative electrode tab section 22 being composed of 100 of the stacked negative electrode core-exposed sections 42. The separators 50 are placed on both outer surfaces of the electrode assembly 20.

Figure 4:
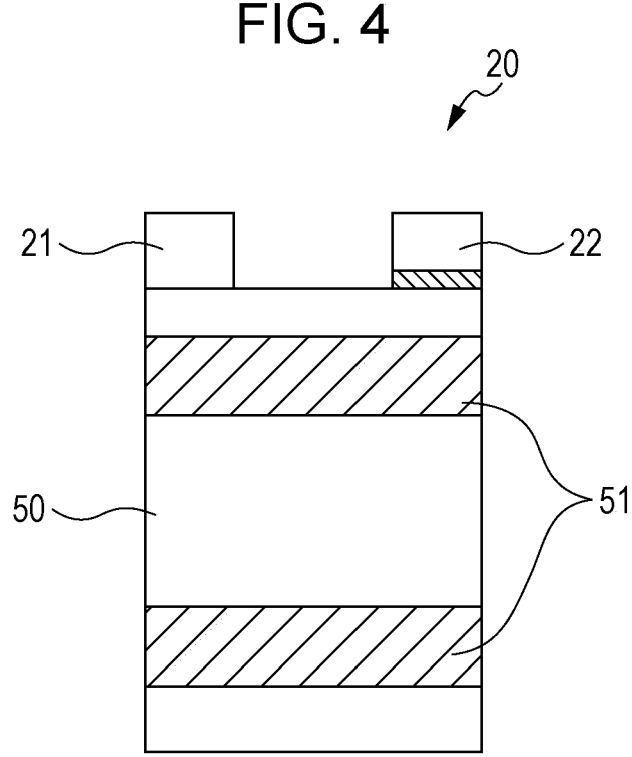
FIG. 4 is a plan view of the electrode assembly shown in FIG. 3.

FIG. 4 is a plan view of the electrode assembly 20. The electrode assembly 20 is desirably in such a state that the positive electrodes 30, the negative electrodes 40, and the separators 50 are fixed with insulating tapes 51 or the like. Alternatively, the positive electrodes 30, the negative electrodes 40, and the separators 50 may be bonded together in such a manner that adhesive layers are provided on the separators 50. Alternatively, after each positive electrode 30 is provided between two of the separators 50 and the peripheries of the separators 50 are welded such that bags are formed, the negative electrodes 40 and the bags, composed of the separators 50, housing the positive electrodes 30 may be stacked.

Figure 5:
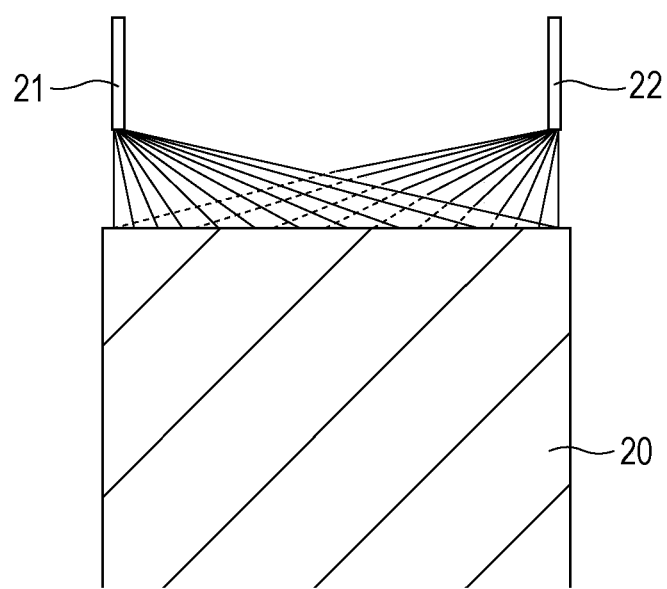
FIG. 5 is a fragmentary side view of the electrode assembly shown in FIG. 3.

FIG. 5 is a fragmentary side view of the electrode assembly 20. As shown in FIG. 5, in the electrode assembly 20, the positive electrode tab section 21 may be formed in such a manner that the positive electrode core-exposed sections 32 are welded together in advance. Welding the positive electrode core-exposed sections 32 in advance allows the positive electrode tab section 21 and the positive electrode current-collecting lead 23 to be readily bonded together. For the negative electrodes 40, as well as the positive electrodes 30, the negative electrode tab section 22 may be formed in such a manner that the negative electrode core-exposed sections 42 are welded together in advance.

Components of the nonaqueous electrolyte secondary battery 10 are described below in detail.

Positive Electrodes

Each positive electrode 30 is composed of the positive electrode core, which is metal foil or the like, and the positive electrode active material layers 31, which are placed on the positive electrode core. The positive electrode core used is foil of a metal, such as aluminium, stable within the potential range of the positive electrode 30; a film having a surface layer made of a metal, such as aluminium, stable within the potential range of the positive electrode 30; or the like. The positive electrode active material layers 31 desirably contain a conductive agent, a binder, and the like in addition to the positive electrode active material.

The positive electrode active material contains a lithium composite oxide, having a layered rock salt-type crystal structure, represented by the formula $LiNi_xCo_yM_{(1-x-y)}O_2$, where M is at least one selected from metal elements, $0.3 \leq x < 1.0$, and $0 < y \leq 0.5$.

From the viewpoint of cost, high capacity, and the like, the amount of nickel (Ni) is desirably large. As described above, x is desirably 0.3 to less than 1.0. For example, $LiNi_{0.33}Co_{0.33}M_{0.33}O_2$ is desirable and $LiNi_{0.5}Co_{0.2}M_{0.3}O_2$ is more desirable.

From the viewpoint of cost, safety, and the like, the metal element M desirably includes manganese (Mn). The metal element M may include another metal element other than Mn. Examples of the other metal element include magnesium (Mg), zirconium (Zr), molybdenum (Mo), tungsten (W), aluminium (Al), chromium (Cr), vanadium (V), cerium (Ce), titanium (Ti), iron (Fe), potassium (K), gallium (Ga), and Indium (In). The metal element M desirably includes at least one selected from the metal elements other than Mn in addition to Mn. Another metal element other than Mn is particularly desirably Al from the viewpoint of thermal stability. For example, about 3% by mass Al is desirably contained with respect to the total amount of Ni, Co, and the metal element M.

The positive electrode active material contains at least one metal element selected from the group consisting of tantalum (Ta) and niobium (Nb). Ta and Nb have a Mohs hardness of 6.5 and high-valence oxides, such as trivalent or tetravalent oxides, of Ta and Nb have a higher Mohs hardness. Ta and Nb are desirably present in the positive electrode active material in the form of solid solutions. Although Ta and Nb are not detected by analyzing the positive electrode active material by X-ray diffractometry in some cases, the presence of Ta and Nb can be confirmed by chemical analysis.

The lithium composite oxide is obtained in such a manner that, for example, $Ni_xCo_yMo_{(1-x-y)}(OH)_2$, a lithium salt, and an oxide of at least one metal element selected from the group consisting of Ta and Nb are mixed together, the growth of particles is promoted in the first stage of calcination, the lithium salt is added, and crystals are grown in the second stage of calcination. Examples of the lithium salt include $Li_2CO_3$, LiOH, and $Li_2O$. Oxides of Ta and Nb are not particularly limited and may be, for example, $Ta_2O_5$ and $Nb_2O_5$.

When $Ni_xCo_yM_{(1-x-y)}(OH)_2$, the lithium salt, and the oxide of at least one metal element selected from the group consisting of Ta and Nb are mixed together before the first stage of calcination, the molar ratio of a transition metal other than Ta and Nb to lithium to at least one metal element selected from the group consisting of Ta and Nb desirably ranges from 1:0.7:0.01 to 1:0.95:0.1. The lithium salt is desirably mixed before the second stage of calcination such that the amount of lithium is 0.05 moles to 1.0 mole when the amount of the transition metal other than Ta and Nb is 1 mole in the first stage of calcination.

The calcination temperature in the first stage is desirably 850° C. to 1,050° C. The calcination temperature in the second stage is desirably 700° C. to 1,000° C.

Particles of the lithium composite oxide are described below in detail. Herein, the lithium composite oxide is a powder containing particles formed by the gathering of grains that are maximum clusters that can be regarded as single crystals, that is, the aggregation of the grains; the term "grains" refers to primary particles; and the term "clusters of grains" refers to secondary particles.

In the lithium composite oxide, grains (primary particles) with a volume-average diameter (D50) of 0.5 μm or more aggregate to form secondary particles. The diameter of the primary particles is desirably 0.5 μm to 5 μm. When the lower limit of the primary particle diameter is less than 0.5 μm, the surface roughness of the secondary particles may possibly increase when the primary particles aggregate to form the secondary particles. When the upper limit of the primary particle diameter is greater than 5 μm, the diameter of the secondary particles may possibly increase when the primary particles aggregate to form the secondary particles.

The primary particle diameter can be determined in such a manner that the primary particles are measured for shape using a scanning electron microscope (SEM). In particular, 10 particles are selected at random from an image obtained by observing particles of the lithium composite oxide using the SEM at 2,000× magnification. Boundaries of the selected 10 particles are observed, whereby each primary particle is determined. The particle maximum longitudinal size, that is, the maximum longitudinal size of the primary particle is determined. The average of the maximum longitudinal sizes of the 10 primary particles is the primary particle diameter.

The volume-average diameter (D50) of particles that are the secondary particles is desirably 5 μm to 30 μm from the viewpoint that the positive electrode active material can be highly filled when the positive electrodes 30 are prepared. The volume-average diameter (D50) is measured with a laser diffraction/scattering particle size distribution analyzer, LA-920, available from Horiba Ltd. using water as a dispersion medium. The term "volume-average diameter (D50)" as used herein refers to median diameter corresponding to a cumulative volume of 50% in a particle size distribution.

The hardness of particles having the above volume-average diameter (D50) means the degree of closeness between the primary particles forming the secondary particles and is evaluated by determining the compression fracture strength of one of the particles, which are the secondary particles. The compression fracture strength (St) is given by the equation $St = 2.8P/\pi d^2$, where P represents the load applied to a particle and d represents the diameter of the particle, described in Nihon Kogyokai-shi, vol. 81, no. 932 (December, 1965), pp. 1,024-1,030. Since the compression fracture strength (St) is determined by dividing the load by the square of the particle diameter as described above, the compression fracture strength (St) highly depends on the particle diameter, resulting in that smaller particles have higher compression fracture strength (St). Therefore, the compression fracture strength (St) is desirably defined as the compression fracture strength (St) of a particle with a predetermined diameter.

The compression fracture strength of one of the particles having the above volume-average diameter (D50) is desirably 500 MPa or more and more desirably 500 MPa to 1,000 MPa. When the compression fracture strength of one of the particles having the above volume-average diameter (D50) is within the above range, the positive electrode active material layer, which contains particles of the lithium composite oxide, can be highly compressed when the positive electrode active material layer is formed. As a result, an increase in battery capacity is achieved.

The size of grains can be expressed by the grain diameter in a (003) vector direction that is the layering direction of the lithium composite oxide, which has the layered rock salt-type crystal structure, and the grain diameter in a (110) vector direction perpendicular to the (003) vector direction. Herein, the grain diameter in the (110) vector direction is evaluated. The grain diameter is determined in such a manner that a powder X-ray diffraction pattern is obtained using a powder X-ray diffractometer, D8ADVANCE, available from Bruker AXS and is analyzed by a whole powder pattern decomposition method (hereinafter referred to as the WPPD method).

Measurement conditions for X-ray diffraction are as described below.
X-ray power 40 kV×40 mA
Goniometer radius: 250 mm
Divergence slit: 0.6°
Scattering slit: 0.6°
Receiving slit: 0.1 mm
Soller slit: 2.5° (incident side, receiving side)

An X-ray diffraction measurement method used is a 2θ/θ method (the measurement of 2θ=15° to 140°, a step width of 0.01°) using a horizontal sample type of integrated optical system. The scanning time is set such that the intensity of a main peak (the (111) plane) is about 10,000 counts.

Analysis procedures using the WPPD method are described below. The grain diameter (nm) obtained by other analysis procedures may possibly be different from the grain diameter obtained by the analysis procedures and are not excluded from the scope of the present disclosure. In the present disclosure, the grain diameter obtained by the analysis procedures should be judged.
Procedure 1: Start the software TOPAS to read measurement data.
Procedure 2: Set "Emission Profile" (select a Cu tube and a Bragg Brentano integrated optical system).
Procedure 3: Set a background (use the Legendre polynomials as profile functions and set the number of items to 8 to 20).
Procedure 4: Set "Instrument" (use "Fundamental Parameter" and input slit conditions, filament length, and sample length).
Procedure 5: Set "Corrections" (use "Sample displacement", use "Absorption" when the packing density of a sample in a sample holder is low, and in this case, fix "Absorption" to the ray absorption coefficient of a measurement sample).
Procedure 6: Set a crystal structure (set the space group R3-m, use lattice constants/grain diameter/lattice strain, and set the spread of a profile by grain diameter and lattice strain to a Lorentzian function).
Procedure 7: Perform calculations (refine the background, "Sample displacement", diffraction intensity, lattice constants, grain diameter, and lattice strain and adopt Le-ball equation for calculations).
Procedure 8: End analysis when the standard deviation of the grain diameter is 6% or less of a refined value. Proceed to Procedure 9 when the standard deviation is greater than 6% of the refined value.
Procedure 9: Set the spread of the profile by lattice strain to a Gaussian function (keep the grain diameter to the Lorentzian function).
Procedure 10: Perform calculations (refine the background, "Sample displacement", diffraction intensity, lattice constants, grain diameter, and lattice strain).
Procedure 11: End analysis when the standard deviation of the grain diameter is 6% or less of a refined value. Analysis is impossible when the standard deviation is greater than 6% of the refined value.

The grain diameter in the (110) vector direction determined as described above is desirably 100 nm to 300 nm and more desirably 150 nm to 300 nm from the viewpoint that the ionic conductivity can be increased and high energy density is achieved.

The surface roughness of secondary particles of the lithium composite oxide that have the above volume-average diameter (D50) depends on the diameter of primary particles and the degree of closeness between the primary particles. The surface roughness of the secondary particles is evaluated by determining the surface roughness of one of the secondary particles. The surface roughness (%) is calculated by the following equation as described in WO 2011/125577:

Surface roughness=(maximum change in radius of particle per degree)/(maximum longitudinal size of particle).

Ten of the secondary particles are measured for surface roughness and the measurements are averaged, whereby the average surface roughness is obtained. From the viewpoint that filling properties of the positive electrode active material are enhanced when the positive electrode active material layer is formed, the average surface roughness of the secondary particles is desirably small, more desirably 10% or less, and further more desirably 5% or less.

Referring back to the description of components forming the positive electrode active material layers 31, the conductive agent is used to increase the electrical conductivity of the positive electrode active material layers 31. Examples of the conductive agent include carbon materials such as carbon black, acetylene black, Ketjenblack, and graphite. These materials may be used alone or in combination.

The binder is used to maintain a good contact between the positive electrode active material and the binder and to increase the bindability of the positive electrode active material and the like to a surface of the positive electrode core. The binder used is polytetrafluoroethylene (PTFE), polyvinylidene fluoride (PVdF), or a modification thereof. The binder may be used in combination with a thickening agent such as carboxymethylcellulose (CMC) or polyethylene oxide (PEO).

Negative Electrodes

Each negative electrode 40 includes the negative electrode core, which is, for example, metal foil or the like, and the negative electrode active material layers 41, which are placed on the negative electrode core. The negative electrode core used may be foil of a metal, such as copper, stable within the potential range of the negative electrode 40; a film having a surface layer made of a metal, such as copper, stable within the potential range of the negative electrode 40; or the like. The negative electrode active material layers 41 desirably contain a binder and a negative electrode active material capable of storing and releasing lithium ions. This binder, as well as the binder contained in the positive electrodes 30, may be PTFE or the like and is desirably a styrene-butadiene copolymer (SBC) or a modification thereof. This binder may be used in combination with a thickening agent such as CMC.

Examples of the negative electrode active material include natural graphite, synthetic graphite, lithium, silicon, silicon compounds, carbon, tin, germanium, aluminium, lead, indium, gallium, lithium alloys, carbon doped with lithium, silicon doped with lithium, alloys of some of these metals, mixtures of some of these materials. In particular, a mixture of graphite and $SiO_x$, where $0.8 \leq x \leq 1.2$, is desirable from the viewpoint of high capacity. In the mixture, the amount of $SiO_x$ is desirably 5% to 15% of the total amount of graphite and $SiO_x$ and more desirably 7%.

Separators

The separators 50 used are, for example, porous sheets having ion permeability and insulating properties. Examples of the porous sheets include microporous thin films, woven fabrics, and nonwoven fabrics. The separators 50 are desirably made of a polyolefin such as polyethylene or polypropylene.

Nonaqueous Electrolyte

The nonaqueous electrolyte contains a nonaqueous solvent and an electrolyte salt dissolved in the nonaqueous solvent. The nonaqueous electrolyte is not limited to any liquid electrolyte (electrolyte solution) and may be a solid electrolyte containing a gel-like polymer.

Examples of the nonaqueous solvent include cyclic carbonates, such as ethylene carbonate (EC), commonly used as nonaqueous solvents; linear esters such as dimethyl carbonate (DMC); carboxylates such as γ-butyrolactone (GBL); cyclic ethers such as crown ether; linear ethers; nitriles; amides; halides obtained by substituting a hydrogen atom in the nonaqueous solvent with a halogen atom such as a fluorine atom; and mixtures of some of these compounds. In particular, a mixture of a cyclic carbonate that is a high-dielectric constant solvent and a cyclic ether that is a low-viscosity solvent is desirably used.

The electrolyte salt is desirably the lithium salt. The lithium salt may be one commonly used as a support salt in conventional nonaqueous electrolyte secondary batteries. Examples of the lithium salt include $LiPF_6$; $LiBF_4$; $LiAsF_6$; $LiClO_4$; $LiCF_3SO_3$; $LiN(FSO_2)_2$; $LiN(C_lF_{2l+1}SO_2)(C_mF_{2m+1}SO_2)$, where l and m are integers not less than 1; $LiC(C_pF_{2p+1}SO_2)(C_qF_{2q+1}SO_2)(C_rF_{2r+1}SO_2)$, where p, q, and r are integers not less than 1; $Li[B(C_2O_4)_2]$ (lithium bis(oxalate) borate (LiBOB)); $Li[B(C_2O_4)F_2]$; $Li[P(C_2O_4)F_4]$; and $Li[P(C_2O_4)_2F_2]$. These lithium salts may be used alone or in combination.

The nonaqueous electrolyte may appropriately contain an additive. The additive is used for the purpose of forming good coatings on the positive and negative electrodes 30 and 40. Examples of the additive include vinyl carbonate (VC), ethylene sulfide (ES), cyclohexylbenzene (CHB), and modifications thereof. These compounds may be used alone or in combination. The percentage of the additive in the nonaqueous electrolyte is not particularly limited and is desirably 0.05% to 10% by mass.

EXAMPLES

The present disclosure is further described below in detail with reference to an example and comparative examples. The present disclosure is not limited to the example. Batteries similar to the nonaqueous electrolyte secondary battery 10 shown in FIG. 1 were prepared in Example 1, Comparative Example 1, and Comparative Example 2 and were evaluated. A detailed method for preparing each of the batteries was as described below.

Example 1

Preparation of Positive Electrodes $Ni_{0.33}Co_{0.33}Mn_{0.33}(OH)_2$, $Li_2CO_3$, and $Ta_2O_5$ were mixed together such that the ratio of the total amount of Ni, Co, and Mn to the amount of Li to the amount of Ta was 1:0.8:0.06 on a mole basis. Thereafter, the mixture was held at 1,000° C. for 10 hours, whereby a precursor of a lithium composite oxide was obtained.

Next, the lithium composite oxide precursor was mixed with LiOH such that ratio of the total amount of Ni, Co, and Mn to the amount of Li was 1:0.31 on a mole basis. This mixture was held at 800° C. for 10 hours, whereby the lithium composite oxide was obtained.

The obtained lithium composite oxide was analyzed by powder X-ray diffractometry using a powder X-ray diffractometer, RINT 2200, available from Rigaku Corporation, the powder X-ray diffractometer being equipped with a Cu Kα radiation source, whereby the crystal structure of the lithium composite oxide was identified. The crystal structure thereof was assigned to a layered rock salt-type crystal structure. Incidentally, Ta could not be detected by X-ray diffraction. This is probably because Ta is dispersed in the layered rock salt-type crystal structure and is present in a Ni site and a Co site in the form of a solid solution.

The composition of the lithium composite oxide was analyzed by inductively coupled plasma (ICP) emission spectrometry using an ICP emission spectrometer, iCAP 6300, available from Thermo Fisher Scientific Inc., resulting in that the composition thereof was $Li_{1.05}Ni_{0.31}Co_{0.31}Mn_{0.31}Ta_{0.06}O_2$.

A fraction of the lithium composite oxide that had a volume-average particle diameter of 3 μm to 30 μm was used as a positive electrode active material.

Next, 92% by mass of the positive electrode active material obtained as described above, 5% by mass of a carbon powder serving as a conductive agent, and 3% by mass of a polyvinylidene fluoride powder serving as a binder were mixed together. The mixture was mixed with an N-methyl-2-pyrrolidone (NMP) solution, whereby slurry was prepared. The slurry was applied to both surfaces of each positive electrode core, made of aluminium, having a thickness of 15 μm by a doctor blade process, whereby positive electrode active material layers were formed. Thereafter, the positive electrode active material layers were highly compressed using a compression roller so as to have an active material density of 3.6 g/cc. After compression, the positive electrode cores were cut so as to have shorter sides with a length of 58 mm and longer sides with a length of 530 mm, whereby positive electrodes 30 were prepared in Example 1.

Preparation of Negative Electrodes

A negative electrode active material used was a mixture of graphite and $SiO_x$ mixed at a mass ratio of 93:7. Negative electrodes 40 were prepare as described below. First, 98% by mass of the positive electrode active material, 1% by mass of a styrene-butadiene copolymer serving as a binder, and 1% by mass of carboxymethylcellulose serving as a thickening agent were mixed together. This mixture was mixed with water, whereby slurry was prepared. The slurry was applied to both surfaces of each negative electrode core, made of copper, having a thickness of 10 μm by a doctor blade process, whereby negative electrode active material layers were formed. Thereafter, the negative electrode active material layers were highly compressed using a compression roller so as to have a predetermined density. The negative electrode cores were cut so as to have shorter sides with a length of 59 mm and longer sides with a length of 690 mm, whereby the negative electrodes 40 were prepared.

Preparation of Nonaqueous Electrolyte

In a nonaqueous solvent prepared by mixing equal volumes of ethylene carbonate (EC) and diethyl carbonate (DEC), 1.6 mol/L of $LiPF_6$ serving as an electrolyte salt was dissolved, whereby an electrolyte solution was prepared. The electrolyte solution was used for battery preparation.

Preparation of Battery

The same battery as the nonaqueous electrolyte secondary battery 10 having the structure described with reference to FIGS. 1 to 4 was prepared by a procedure below using the positive electrodes 30, negative electrodes 40, and electrolyte solution prepared as described above. That is, the positive electrodes 30 and negative electrodes 40 prepared as described above were stacked with the separators 50 therebetween and were fixed with the insulating tapes 51, whereby a stack type of electrode assembly 20 was prepared. Next, in the electrode assembly 20, positive electrode core-exposed sections 32 and negative electrode core-exposed sections 42 were separately welded, whereby a positive electrode tab section 21 and a negative electrode tab section 22, respectively, were formed. The positive electrode tab section 21 and the negative electrode tab section 22 were bonded to a positive electrode current-collecting lead 23 and a negative electrode current-collecting lead 24, respectively. Thereafter, the electrode assembly 20 was housed in a rectangular enclosure can 11, made of aluminium, having a length of 65 m, a width of 25 mm, and a height of 10 mm. The sealing plate 12 was bonded to an opening of the enclosure can 11. The electrolyte solution was supplied to the enclosure can 11 through a liquid inlet 13a. Thereafter, the enclosure can 11 was hermetically sealed with a sealing plug 13. The battery prepared as described above had a capacity of 600 Wh/L. The battery is hereinafter referred to as the battery 10A1.

Comparative Example 1

A battery 10C1 was prepared in Comparative Example 1 in substantially the same manner as that used in Example 1 except that a method for producing a positive electrode active material was changed. In Comparative Example 1, the method for producing the positive electrode active material was as described below. $Ni_{0.33}Co_{0.33}Mn_{0.33}(OH)_2$ and $Li_2CO_3$ were mixed together such that the ratio of the total amount of Ni, Co, and Mn to the amount of Li was 1:1.05 on a mole basis. Thereafter, the mixture was held at 950° C. for 10 hours, whereby a lithium composite oxide was obtained.

Comparative Example 2

A battery 10C2 was prepared in Comparative Example 2 in substantially the same manner as that used in Example 1 except that a method for producing a positive electrode active material was changed. In Comparative Example 2, the method for producing the positive electrode active material was as described below. $Ni_{0.33}Co_{0.33}Mn_{0.33}(OH)_2$ and $Li_2CO_3$ were mixed together such that the ratio of the total amount of Ni, Co, and Mn to the amount of Li was 1:0.8 on a mole basis. Thereafter, the mixture was held at 1,000° C. for 10 hours, whereby a precursor of a lithium composite oxide was obtained.

Next, the lithium composite oxide precursor was further mixed with LiOH such that 1 mole of $Ni_{0.33}Co_{0.33}Mn_{0.33}(OH)_2$ was mixed with 0.25 moles of LiOH. The mixture was held at 800° C. for 10 hours, whereby the lithium composite oxide was obtained.

Measurement of Charge/Discharge Characteristics

The battery 10A1, the battery 10C1, and the battery 10C2 were charged at a constant current of 1 C/h at 25° C. until the voltage of each battery reached 4.35 V. The battery 10A1, the battery 10C1, and the battery 10C2 were then discharged until the voltage of each battery reached 2.5 V. The discharge capacity obtained in this manner was defined as the initial capacity. A cycle of charge and discharge was repeated 500 times. The 500th-cycle capacity retention was determined as a charge/discharge characteristic in such a manner that a value obtained by dividing the 500th-cycle discharge capacity by the first-cycle discharge capacity was multiplied by 100.

The table below shows the compression fracture strength, the grain diameter in a (110) vector direction, the surface roughness, and the 500th-cycle capacity retention determined in Example 1 and Comparative Examples 1 and 2. Substantially the same methods as the above-mentioned methods were used to measure the compression fracture strength, the grain diameter in a (110) vector direction, and the surface roughness.

TABLE

| | Compression fracture strength (MPa) | Grain diameter (nm) | Surface roughness (%) | Capacity retention (%) |
|---|---|---|---|---|
| Example 1 (battery 10A1) | 600 | 110 | 4 | 87 |
| Comparative Example 1 (battery 10C1) | 150 | 144 | 8 | 81 |
| Comparative Example 2 (battery 10C2) | 300 | 110 | 5 | 85 |

Figure 6:
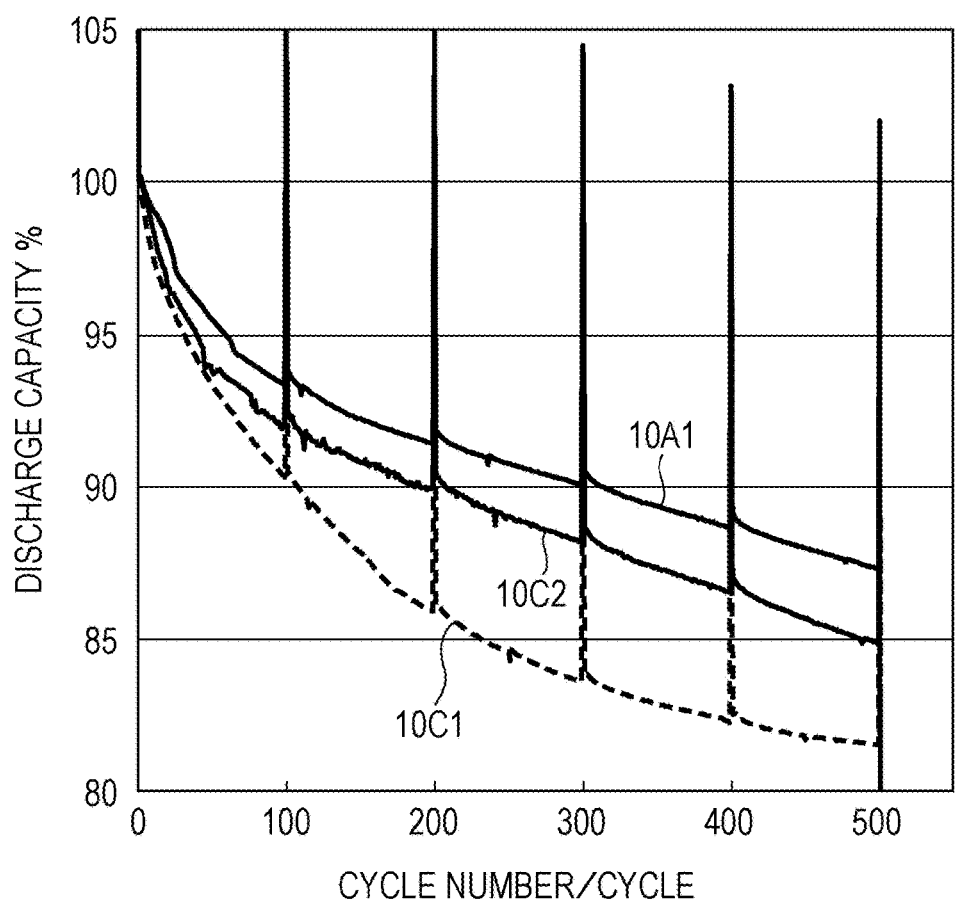
FIG. 6 is a graph showing the relationship between the number of cycles and the capacity retention determined in Example 1 and Comparative Examples 1 and 2.

FIG. 6 is a graph showing the relationship between the number of cycles and the capacity retention determined in Example 1 and Comparative Examples 1 and 2. As is clear from the table and FIG. 6, the battery 10A1 has more excellent cycle characteristics as compared to the battery 10C1 and the battery 10C2. That is, good cycle characteristics were obtained by using particles of a lithium composite oxide that had a compression fracture strength of 500 MPa or more in a battery as a positive electrode active material. When the compression fracture strength is less than 500 MPa, the degree of closeness between primary particles as the hardness of particles is low, the primary particles are sparse like conventional ones, and particle cracking is likely to occur. Therefore, the primary particles, which are sparse, are converted into secondary particles which are tight and dense, thereby allowing particles of a lithium composite oxide to have appropriate hardness. The use of such particles probably allows cycle characteristics to be enhanced because the particles, which are secondary particles, are unlikely to be crushed in the process of repeating the intercalation and deintercalation of lithium in an active material in a charge/discharge cycle.

In the case where particles are prepared so as to have a hardness within the above-mentioned range, the grain diameter in the (110) vector direction is about 500 nm to 600 nm, the mobility of lithium is low, and intercalation and deintercalation are suppressed; hence, the deterioration of capacity is caused. Therefore, the grain diameter in the (110) vector direction needs to be small. However, when the grain diameter in the (110) vector direction is extremely small, spaces in which lithium can be intercalated are small and therefore the capacity is low. In the present disclosure, the grain diameter in the (110) vector direction can be adjusted to 100 nm to 300 nm and therefore an appropriate grain size is obtained.

Figure 7:
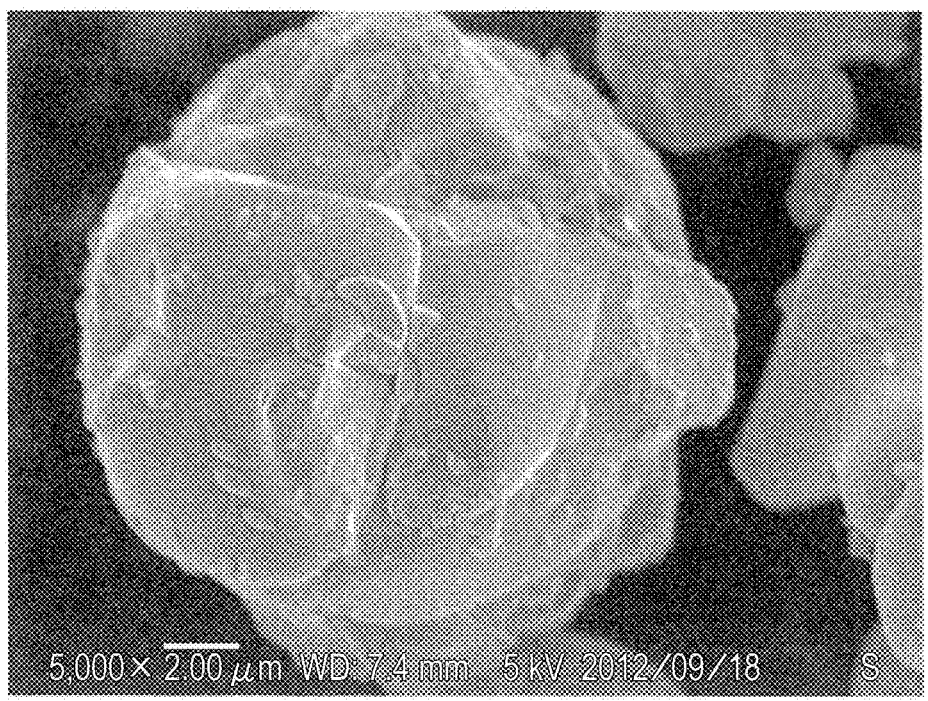
FIG. 7 is an illustration showing a SEM image of a positive electrode active material prepared in Example 1.
Figure 8:
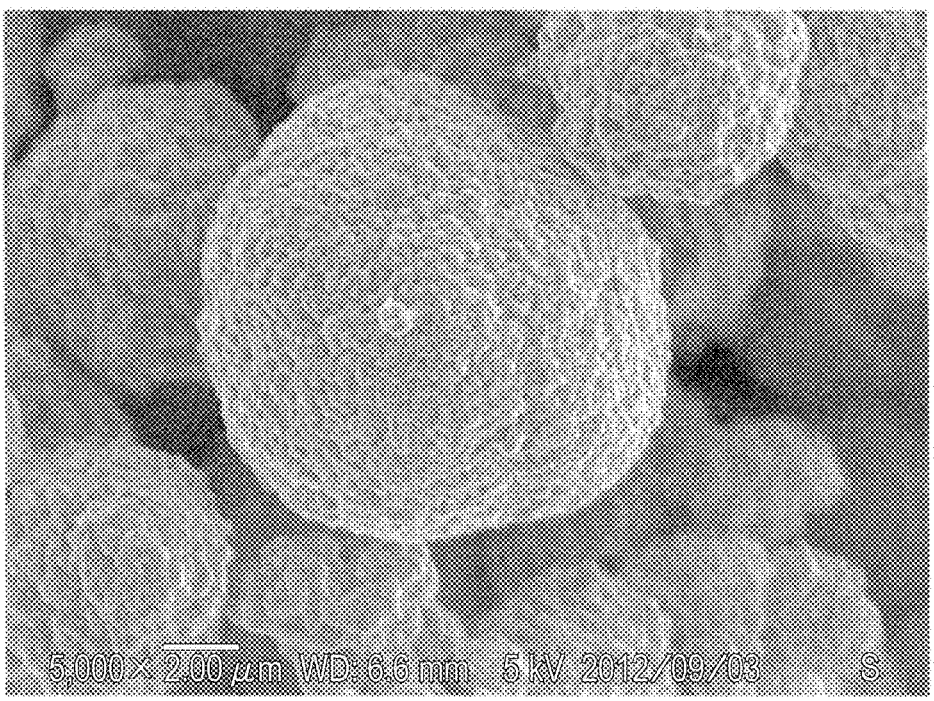
FIG. 8 is an illustration showing a SEM image of a positive electrode active material prepared in Comparative Example 1.
Figure 9:
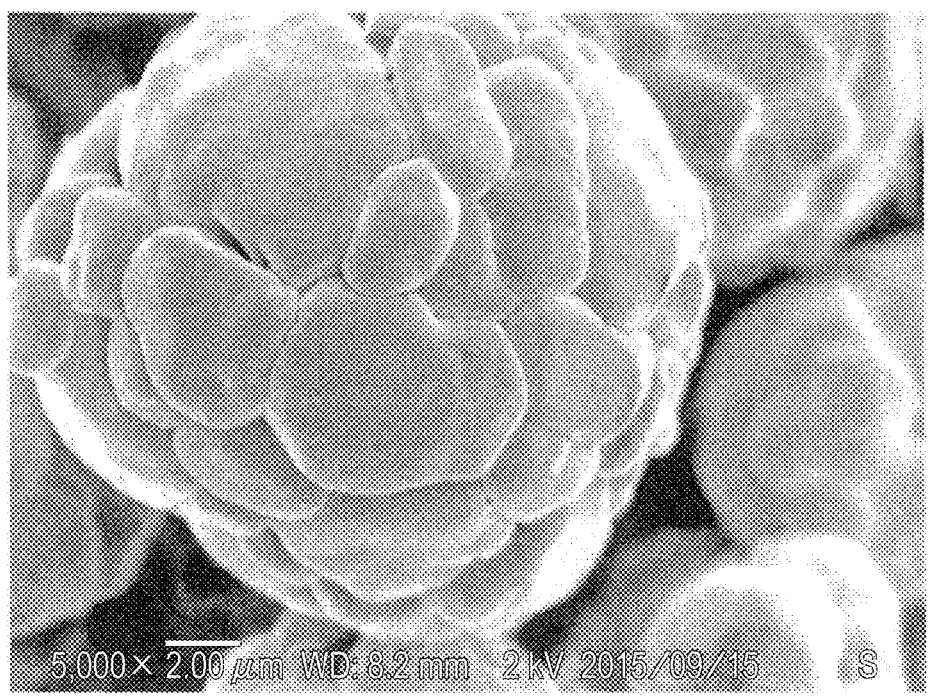
FIG. 9 is an illustration showing a SEM image of a positive electrode active material prepared in Comparative Example 2.

FIGS. 7 to 9 are illustrations showing SEM images of the positive electrode active materials prepared in Example 1 and Comparative Examples 1 and 2. As shown in FIGS. 7 to 9, it can be confirmed that substantially spherical particles are obtained in Example 1 and Comparative Examples 1 and 2. Furthermore, it is clear that the particles obtained in Example 1 have lower surface roughness as compared to the particles obtained in each of Comparative Examples 1 and 2.

According to the above-mentioned embodiment, the hardness of particles can be adjusted to 500 MPa or more, the grain diameter in the (110) vector direction can be adjusted to 100 nm to 300 nm, and a positive electrode active material having high capacity and excellent cycle characteristics and a nonaqueous electrolyte secondary battery containing the positive electrode active material can be obtained.

A positive electrode active material, according to the present disclosure, for nonaqueous electrolyte secondary batteries is not limited to the above-mentioned embodiment and has, for example, configurations described in items below.

Item 1

A positive electrode active material for use in nonaqueous electrolyte secondary batteries,
the active material being composed of particles each formed by the gathering of grains that comprises at least one metal element selected from the group consisting of Ta and Nb, wherein one of the particles has a compression fracture strength of 500 MPa or more, and the grain diameter in the (110) vector direction of the particles is 100 nm to 300 nm.

Item 2

The positive electrode active material specified in Item 1, wherein the metal element is present in the positive electrode active material in the form of a solid solution.

Item 3

The positive electrode active material specified in Item 1 or 2, wherein the grains have a volume-average diameter (D50) of 0.5 µm or more and gather to form the particles.

Item 4

The positive electrode active material specified in any one of Items 1 to 3, wherein the particles have a volume-average diameter (D50) of 3 µm to 30 µm.

Item 5

The positive electrode active material specified in any one of Items 1 to 4, wherein the particles have an average surface roughness of 10% or less.

Item 6

A positive electrode for nonaqueous electrolyte secondary batteries, containing the positive electrode active material specified in any one of Items 1 to 5,
wherein the active material density of the positive electrode is 3.6 g/cc or more.

Item 7

A nonaqueous electrolyte secondary battery including the positive electrode specified in Item 6, comprising:
a stack-type electrode assembly in which plate-shaped positive electrodes and plate-shaped negative electrodes are stacked with separators therebetween.

What is claimed is:

1. A positive electrode active material for use in nonaqueous electrolyte secondary batteries,
the active material containing $LiNi_xCo_yM_{(1-x-y)}O_2$, wherein M is at least one selected from metal elements, $0.3 \leq x < 1.0$ and $0 < y \leq 0.5$, and the active material includes at least one selected from the group consisting of Ta and Nb, composed of particles each formed by a gathering of grains, wherein one of the particles has a compression fracture strength of more than 500 MPa, and the grain diameter in the (110) vector direction of the grains is 100 nm to 300 nm wherein the Ta or Nb is present in the positive electrode active material in the form of a solid solution.

2. The positive electrode active material according to claim 1, wherein the grains have a volume-average diameter (D50) of 0.5 µm or more and gather to form the particles.

3. The positive electrode active material according to claim 1, wherein the particles have a volume-average diameter (D50) of 3 µm to 30 µm.

4. The positive electrode active material according to claim 1, wherein the particles have an average surface roughness of 10% or less.

5. A positive electrode for nonaqueous electrolyte secondary batteries, containing the positive electrode active material according to claim 1,
wherein the active material density of the positive electrode is 3.6 g/cc or more.

6. A nonaqueous electrolyte secondary battery including the positive electrode according to claim 5, comprising:
stack-type electrode assembly in which plate-shaped positive electrodes and plate-shaped negative electrodes are stacked with separators therebetween.

7. The positive electrode active material according to claim 1, wherein M includes Mn.

8. The positive electrode active material according to claim 7, wherein M further includes at least one selected from the group consisting of Mg, Zr, Mo, W, Al, Cr, V, Ce, Ti, Fe, K, Ga, and In.

* * * * *